W. N. DURANT.
MACHINE FOR AND METHOD OF EXTRACTING ESSENTIAL OILS FROM FRUIT PEELS.
APPLICATION FILED FEB. 1, 1918.
1,287,582.
Patented Dec. 10, 1918.
3 SHEETS—SHEET 1.
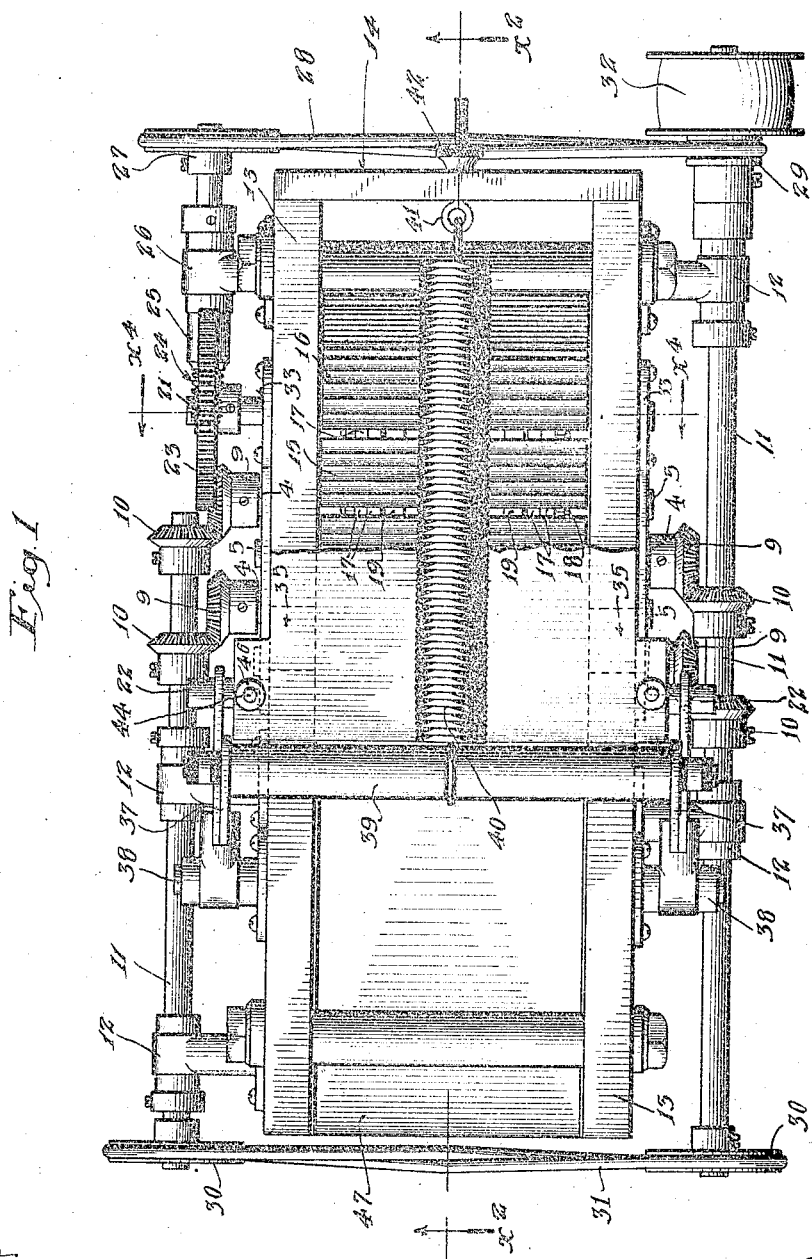

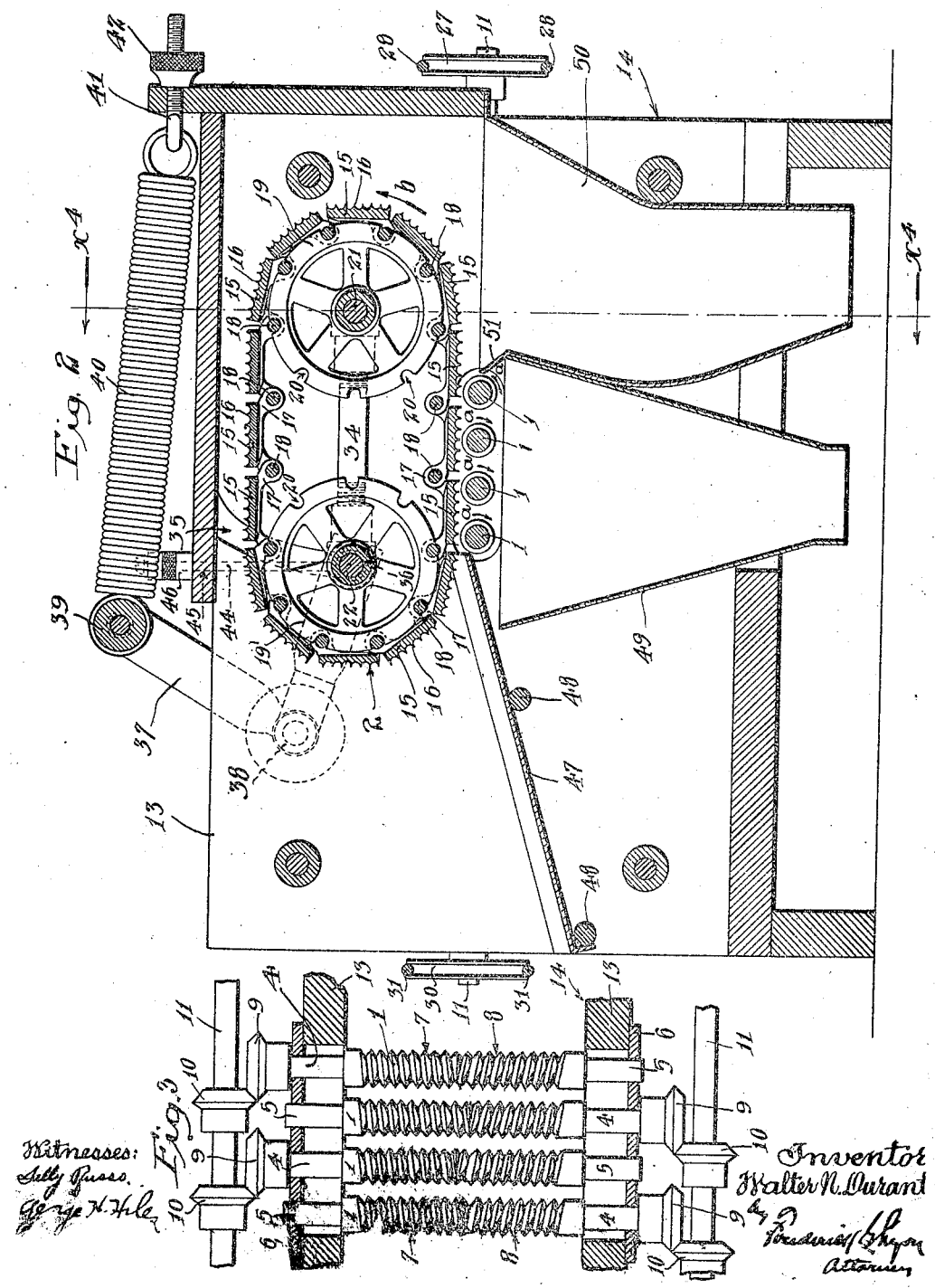

W. N. DURANT.
MACHINE FOR AND METHOD OF EXTRACTING ESSENTIAL OILS FROM FRUIT PEELS.
APPLICATION FILED FEB. 1, 1918.
1,287,582.
Patented Dec. 10, 1918.
3 SHEETS—SHEET 3.
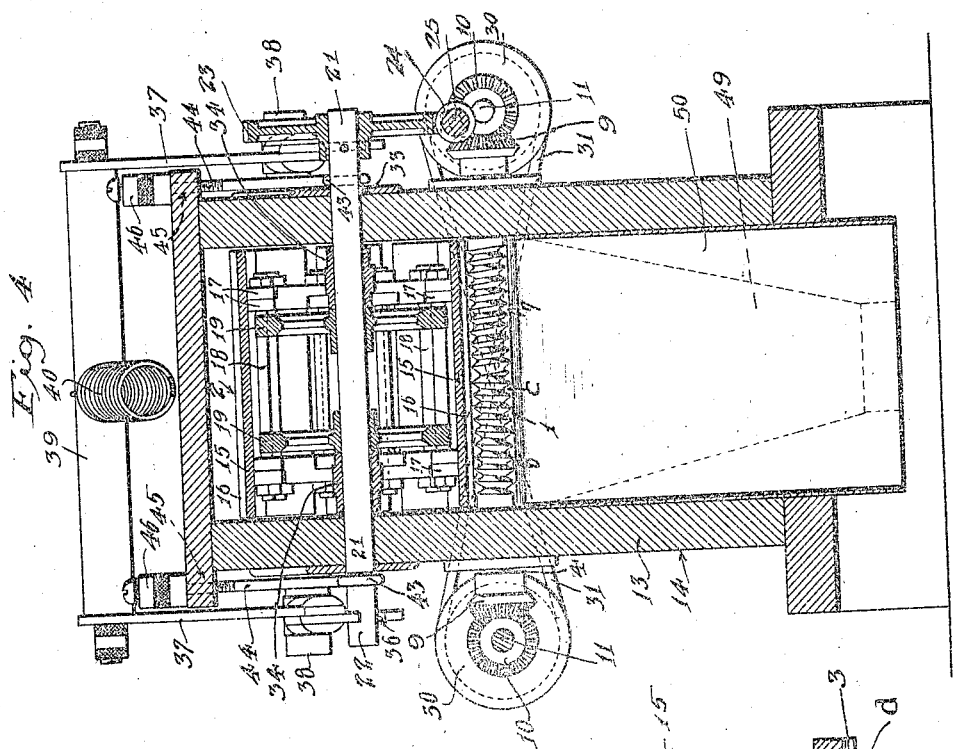
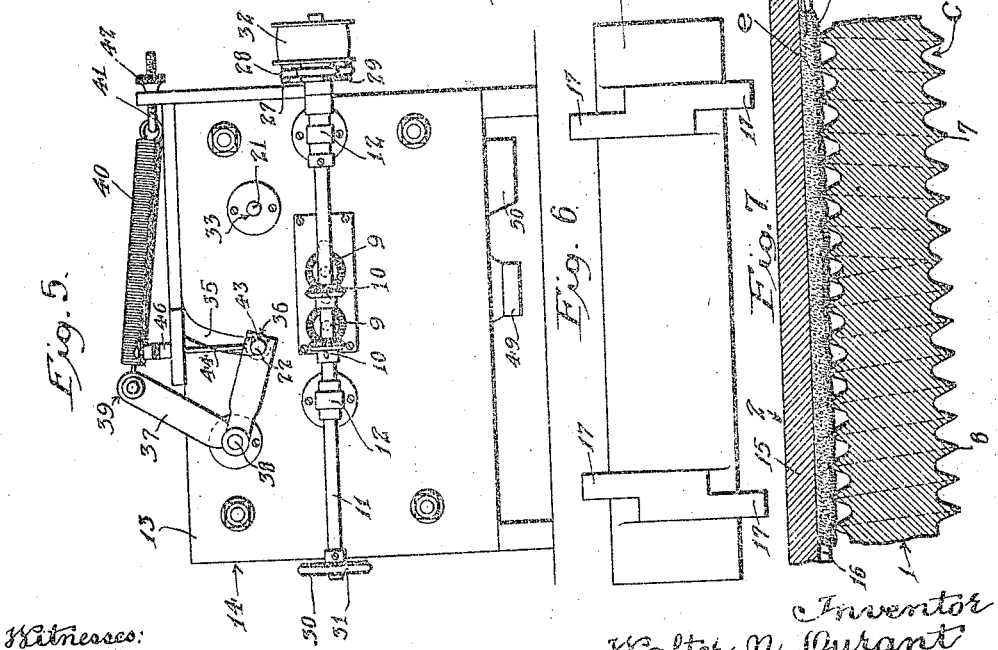
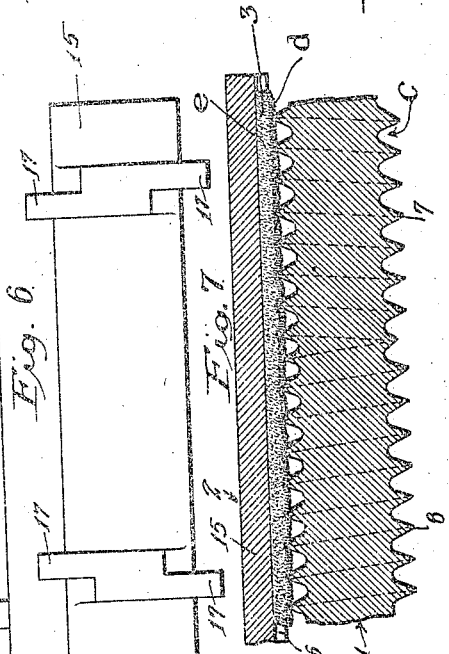

UNITED STATES PATENT OFFICE.

WALTER N. DURANT, OF ALHAMBRA, CALIFORNIA, ASSIGNOR TO ALMA F. DURANT, OF ALHAMBRA, CALIFORNIA.

MACHINE FOR AND METHOD OF EXTRACTING ESSENTIAL OILS FROM FRUIT-PEELS.

1,287,582.

Specification of Letters Patent. Patented Dec. 10, 1918.

Application filed February 1, 1918. Serial No. 214,815.

*To all whom it may concern:*

Be it known that I, WALTER N. DURANT, a citizen of the United States, residing at Alhambra, in the county of Los Angeles and State of California, have invented a new and useful Machine for and Method of Extracting Essential Oils from Fruit-Peels, of which the following is a specification.

This invention relates to machines for obtaining oil from the rinds or peels of fruit and is especially adapted to extract the essential oil from citrus fruit rinds.

An object of the invention is to make provision for extracting a maximum amount of oil from the fruit peel.

Another object is to effect the foregoing by a comparatively simple construction.

Another object is to make provision for squeezing the oil from the oil cells in such manner as to avoid the absorption of said oil by the inner portion of the rind, said inner portion being practically devoid of oil but being of a sponge-like nature which readily absorbs the oil if the oil cells be broken adjacent said spongy portion.

Oil has been obtained from citrus fruit rinds heretofore by the well-known hand method and has also been obtained by utilizing presses. In pressing the oil out by the machines heretofore in use, it is apparent that the inner portion of the rind will absorb the oil when the oil cells are crushed by action of the machine. By this invention such detrimental crushing of the oil cells is prevented. By this invention the greater portion of the pressure is produced edgewise in the plane of the outer portion of the peel so as in effect to squeeze the oil outward toward the outer surface of the rind.

The oil obtained by operation of this machine, after treatment which is the subject of a separate application for patent, is absolutely pure and does not require distillation. Such distillation of the essential oils of citrus fruit is detrimental to the oil, since it causes the oil to lose the larger portion of its aroma.

The accompanying drawings illustrate the invention:

Figure 1 is a plan view of the invention, a portion of the top of the frame being broken away for clearness of illustration.

Fig. 2 is a sectional elevation on line indicated by $x^2$—$x^2$, Fig. 1.

Fig. 3 is a fragmental plan view showing the pressing screws, the frame being shown in section.

Fig. 4 is a sectional elevation on line indicated by $x^4$—$x^4$, Figs. 1 and 2.

Fig. 5 is a reduced front elevation of Fig. 1.

Fig. 6 is an inverted plan view of one of the apron plates.

Fig. 7 is an enlarged sectional elevation showing fragments of one of the pressing screws and apron and also showing a fragment of the rind or peel being operated on to express the oil therefrom.

The main portion of the invention comprises a screw or screws indicated at 1 and an apron indicated at 2, the rind 3, see Fig. 7, being adapted to pass between the screws and apron. It is understood that one or more screws may be provided according to the requirements of the constructor, there being four in the instance shown, and these screws are provided at their ends with shafts 4, 5 journaled in frame plates 6. The threads of the screws 1 may be of any suitable construction for carrying out the purposes of the invention, and said screws may be either threaded right or left-hand or may be provided with both right and left-hand threads. In Figs. 3 and 4 each screw is shown provided with both right and left-hand threads 7, 8, the right-hand threads extending from the middle portion of the screw toward one end thereof and the left-hand threads extending from the middle portion toward the other end thereof. The screw threads 7, 8 are so arranged that when the screws are turned clockwise in Fig. 3 they function as screw conveyers to tend to force any material which they engage toward the middle portions of the screws.

The screws are rotated by any suitable means and in this instance the shafts 4 are provided with bevel gears 9 meshing with bevel gears 10 on longitudinally extending shafts 11 journaled at 12 on the sides 13 of the frame indicated in general by the character 14. The frame may be of any desired construction.

The apron 2 may be of any desired construction capable of effecting the purposes of the invention and in the instance shown said apron is in the form of an endless belt comprising plates 15 which may be provided on their outer faces with longitudinally extending corrugations or ribs 16. These plates 15 are provided with links 17, the links of adjacent plates being pivotally connected to one another by pins 18. The apron 2 passes around sprocket wheels 19, 19′ which are provided with notches 20 to accommodate the pins 18. The sprocket wheels 19, 19′ are mounted on shafts 21, 22 respectively. The sprocket wheel 19 is fast on the shaft which is driven by a worm wheel 23 meshing with a worm 24 on a shaft 25 that is journaled at 26 to one side of the frame. This shaft 25 is driven by any suitable means and in the instance shown in the drawings said shaft is provided with a pulley 27 connected by an endless belt 28 to a pulley 29 on one of the shafts 11. The shafts 11 are provided at one end with pulleys 30 which are connected together by an endless belt 31. Power is applied to one of the shafts 11 and for this purpose the shaft 11 at one side is provided with a pulley 32 adapted to be driven by a belt, not shown, from any suitable source of power.

The shaft 21 is journaled at 33 in the frame, and the sprockets 19′ are loose on the shaft 22 and are mounted to be movable about the shaft 21. For this reason the shaft 22 is connected by adjustable arms 34 to the shaft 21. By adjusting the arms 34 slack in the apron may be taken up.

The outer ends of the shaft 22 project through slots 35 in the frame sides 13 and said ends are accommodated in slots 36 of bell cranks 37 which are pivoted at 38 to the sides 13 of the frame. The bell crank levers 37 are connected together by a transverse member 39 and fastened to said transverse member is one end of a coil spring 40, the other end of said spring being fastened to an adjusting screw 41 passing through the frame, and the outer projecting end of said adjusting screw being provided with an adjusting nut 42. When the nut 42 is turned it moves the screw in or out so as to decrease or increase the tension of the spring 40. It is understood that a suitable weight may be used in lieu of the spring as the mechanical equivalent thereof.

From the foregoing it is clear that the bell cranks 37, transverse member 39 and spring 40 constitute means tending to move the apron 2 toward the screws 1 so as to produce pressure on the rind therebetween. In its broader aspects the invention is not limited to the particular pressure-producing means above described. Downward movement of the shaft 22 is limited by any suitable means and in the instance shown the outer ends of said shaft project through eyes 43 of rods 44 and said rods project upward through holes 45 of the frame and the projecting upper ends of said rods are provided with adjusting nuts 46 which are adapted to engage the upper face of the frame to limit the downward movement of the shaft 22.

Extending from adjacent the forwardmost screw 1 to the forward end of the frame is a table 47 supported by transverse members 48 of the frame.

Arranged within the frame beneath the screws 1 is a funnel 49 adapted to direct the oil downward from the screws to a vessel, not shown, which may be placed beneath the open end of the funnel.

Within the frame and rearward of the funnel 49 is a chute 50 which is provided at its upper edge with a lip 51 extending above the upper edge of the funnel 49 and aslant forward toward the rearmost screw 1. This chute 50 receives the peels or rinds discharging from the rearmost screw and directs them into a suitable vessel, not shown, which may be placed beneath the lower open end of the chute.

In practice the machine operates as follows:

Power is applied to turn the pulley 32 to cause rotation of the screws 1 in the direction of the arrows $a$, Fig. 2, and to cause rotation of the apron 2 in the direction of the arrow $b$. There is considerable difference in surface speed of travel between the screws 1 and apron 2. For instance by the driving connections above described when the screws rotate at approximately 600 revolutions per minute there is but 32 inches of travel per minute of the apron.

The pieces of rind or peel to be treated will be fed from the table 47 to the space between the screws 1 and apron 2, as clearly shown in Fig. 7, with the outer side of the peel 3 toward the screw-threads. The tension of the spring 40 will cause considerable pressure of the apron on the peel and consequently of the peel upon the screw. This screw rotating tends to force the outer portion of the peel containing the oil cells toward the middle portion of the screw from both sides thereof. The pressure may even be great enough so that the screw-threads will slightly score or shred the outer portion of the peel. It is clear that the action of the screw-threads on the outer portion of the peel is such as to cause edgewise pressure on the peel so as to cause pressure against the sides of the oil cells. These oil cells being broken or scored on their outermost ends by the screw threads allow the oil to be forced outward to the outer surface of the peel, whence it passes into the spiral channel $c$ of the screw and from the spiral channel the oil drops into the funnel 49 and thence into the vessel provided to receive it. During the edgewise pressing movement of the screw upon the peel the lower run of the apron 2 moves rearward very slowly, much slower than the endwise progressive motion of the threads of the screws 1. Thus the apron retards the forward movement of the peel and holds the peel firmly down on the screw. This is the function of the apron and the invention is not limited to the particular construction shown in the drawings since it is obvious that other constructions may be provided to obtain the same results. The forward movement of the apron permits the peel to gradually work from between the apron and first screw to between the apron and the second screw and the edgewise pressing action is thereupon repeated by the second screw so as to press still more oil from the peel. From the second screw the peel then passes to the third screw and from the third to the fourth and thence into the chute 50 whence it drops into a suitable vessel placed to receive it. The peel thus freed from substantially all of the oil can be candied or used in any other of the numerous ways in which citrus fruit peel is used.

By referring to Fig. 7, it is seen that it is desirable to have just sufficient pressure produced by the spring 40 to cause the screw-threads to cut or press into the outer portion $d$ of the peel, which portion contains practically all of the essential oil, but the pressure is insufficient to cause the screw-threads to cut into the spongy white inner portion $e$ of the peel. It is noted that one reason for this is that if the screw-threads cut into the portion $e$ some of the essential oil would be absorbed by said spongy portion and could not readily be extracted therefrom. In fact this has been a great difficulty heretofore in the extraction of oil from the citrus peels since machines heretofore designed to operate thereon have either comminuted the peel or have pressed the oil into the peel portion $e$. In either case it is very difficult to release the oil from the portion $e$ and distillation has been resorted to as a part of the process. This, as explained above, largely destroys the aroma of the oil and it has therefore been necessary in prior processes to treat the rind with the oil so as to regain some of the aroma.

Of course the peel varies in thickness and also in hardness and the tension of the spring 40 will be accordingly adjusted to obtain the correct pressure for the particular grade of peel being run through the machine. In some instances the screw does not cut into the peel at all but merely sinks into the surface so as to corrugate or wrinkle it to cause side pressure against the walls of the oil cells adjacent the screw channel $c$ so as to press out the oil. In other instances the screw scores or scarifies the surface of the peel more or less but the scoring only affects the portion $d$ of the peel so that the maximum amount of oil can be readily squeezed from the peel.

From the foregoing it will be clear that by the operation of the machine there is performed a new method of extracting oil from fruit peel consisting in subjecting the peel to edgewise pressure in the plane of the peel, that the new method consists in pressing a part of the outer portion of the peel toward another part of said outer portion, and that the new method consists in causing corrugating or wrinkling of the outer portion of the peel.

The screws 1 constitute members functioning to produce edgewise pressure in the plane of the peel and, therefore, the invention in its broader phases is not limited to the exact construction described above and it is understood that the invention includes such changes and modifications as lie within the spirit and scope of the appended claims.

Though I at present prefer to use the apron 2 for holding the peel on the screws 1, it is understood that said apron is not absolutely essential to carrying out of the improved method since the peel may be held against the screws by the hand of the operator and the invention therefore includes a construction in which the apron is omitted.

I claim:

1. A machine for extracting oil from peel comprising means to hold the peel, and means to produce edgewise pressure on the peel in the plane of the peel.

2. A machine for extracting oil from peel comprising means to hold the peel, and means to corrugate the outer portion of the peel.

3. A machine for extracting oil from peel comprising means to hold the peel, and means to produce bending of portions of the peel.

4. A machine for extracting oil from peel comprising means to hold the peel, and means to produce wrinkling of the outer portion of the peel.

5. A machine for extracting oil from peel comprising a rotatively mounted screw, and means to turn the screw.

6. A machine for extracting oil from peel comprising a rotatively mounted screw, means to turn the screw, and means to press the peel against the screw.

7. A machine for extracting oil from peel comprising a rotatively mounted screw, means to turn the screw, a movably mounted apron to press the peel against the screw, and means to move the apron at less surface speed than the endwise progressive motion of the threads of the screw.

8. A machine for extracting oil from peel comprising a rotatively mounted screw having both right and left-hand threaded portions, and means to turn the screw.

9. A machine for extracting oil from peel comprising a rotatively mounted screw having both right and left-hand threaded portions, means to turn the screw, and means to press the peel against the screw.

10. A machine for extracting oil from peel comprising a rotatively mounted screw having both right and left-hand threaded portions, a movably mounted apron to press the peel against the screw, and means to move the apron at less surface speed than that of the screw.

11. A machine for extracting oil from peel comprising an apron, means to cause travel of the apron, and means to force the outer portion of the peel transversely to the direction of motion of the apron in engagement therewith.

12. A machine for extracting oil from peel comprising an apron, and means tending to force a part of the outer portion of the peel transversely of the apron toward another part of the outer portion of the peel to cause edgewise pressure in the plane of the peel.

13. A machine for extracting oil from peel comprising a screw, means to rotate the screw, an apron, means to press the apron toward the screw, and means to drive the apron.

14. A machine for extracting oil from peel comprising an apron, means to drive the apron, a screw beneath the apron, means to turn the screw, and means to produce relative movement of the apron and screw toward one another.

15. A machine for extracting oil from peel comprising an endless apron, means to drive the endless apron, a screw adjacent the outer face of the apron, and means to turn the screw.

16. A machine for extracting oil from peel comprising a frame, a shaft journaled in said frame, sprocket wheels for said shaft, a second shaft shiftable relative to the frame, sprocket wheels for the second shaft, an endless apron mounted on the sprocket wheels, means to turn the first named shaft, arms connecting the shafts to one another, a screw adjacent the apron, means to turn the screw, and means connected with the second shaft tending to move the second shaft about the first shaft.

17. The method of extracting oils from peels, which consists in producing edgewise pressure on the peel in the plane of the peel.

18. The method of extracting oils from peels, which consists in corrugating the outer portion of the peel.

19. The method of extracting oils from peels, which consists in producing pressure on the peel, and causing bending of portions of the peel while under pressure.

20. The method of extracting oils from peels, which consists in producing wrinkling of the outer portion of the peel.

21. The method of extracting oils from peels, which consists in producing pressure at one time on only alternate portions of the peel.

Signed at Los Angeles, California, this 25th day of January, 1918.

WALTER N. DURANT.

Witnesses:
GEORGE H. HILES,
L. BELLE WEAVER.